Patented Oct. 26, 1948

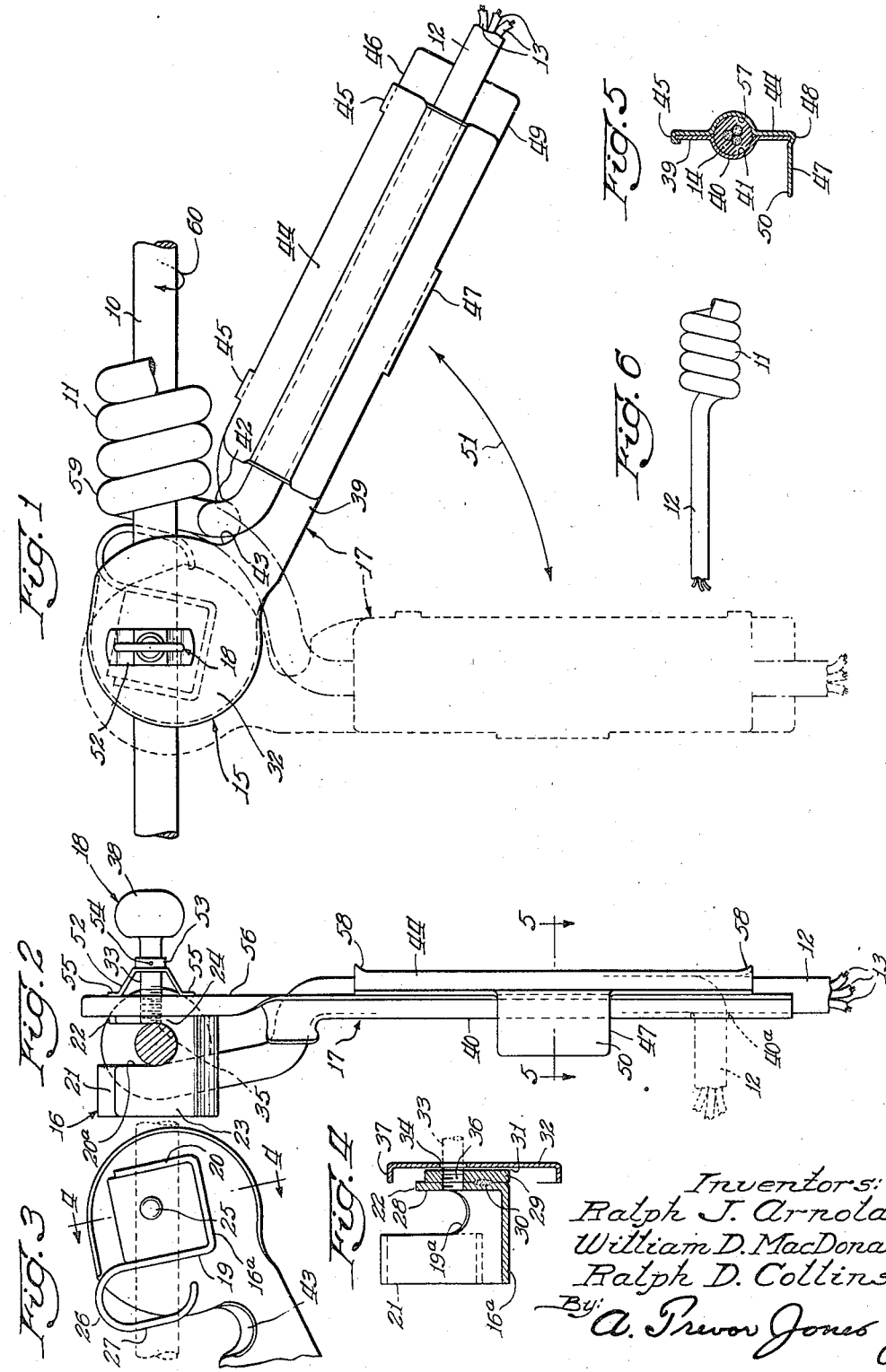

2,452,435

UNITED STATES PATENT OFFICE

2,452,435

APPARATUS FOR PRODUCING ELASTIC COILS WITH CONNECTING TAILS

Ralph J. Arnold, Western Springs, Ill., and William D. MacDonald, Santa Monica, and Ralph D. Collins, Beverly Hills, Calif., assignors, by mesne assignments, of one-half to Kellogg Switchboard and Supply Company, Chicago, Ill., a corporation of Illinois, and onehalf to Ralph D. Collins, Beverly Hills, Calif.

Application August 8, 1945, Serial No. 609,686

6 Claims. (Cl. 18—6)

This invention relates to apparatus for producing elastic coil cables with connecting tails.

It is now well known that retractile and extensible extension cords or cables, for various purposes, principally electrical, may be satisfactorily constructed by providing a conductor or a plurality of conductors with a covering or sheath of incompletely vulcanized rubber or the like, then closely coiling it into the form of a helix, and then vulcanizing it, after which the cable will be readily extensible, as, for example, for extension cord purposes, without damage thereto, while being automatically retracted by its own resilience to closely coiled helical formation when released, and that the resilience of the cable may be enhanced by reversing the direction of the coils as broadly disclosed and claimed in the Campbell Patent No. 2,173,096.

In the application of Ralph D. Collins, S. N. 588,043, filed April 12, 1945, method and means for making cables of this class are disclosed, and in Crehan and Arnold application, S. N. 592,398, filed May 7, 1945, other means are shown for this purpose.

The present invention aims to provide still further improved method and means which obviate certain difficulties encountered in the production of elastic coil cables with longitudinal ends, particularly in enhancing the speed of production and reducing the handling of the cable in the process.

These and other objects and advantages will be apparent from the following description, taken together with the accompanying drawings, showing an illustrative embodiment of the invention and steps of operation, and in which drawings—

Figure 1 is a plan view of means employed in accordance with the present disclosure, and illustrating by full and broken lines alternative positions of the parts corresponding to respective steps of operation;

Figure 2 is an end view of parts shown in Figure 1 looking thereat from the lefthand side of Figure 1 and assuming that the parts are in the position shown in broken lines in Figure 1;

Figure 3 is a fragmentary view of parts show in Figure 1 but looking thereat from the bottom or reverse side;

Figure 4 is a cross section taken on the line 4—4 of Figure 3;

Figure 5 is a section taken on the line 5—5 of Figure 2; and

Figure 6 is a reduced view of the cable after reversal.

Referring in detail to the illustrative embodiment shown in the drawings, the mandrel 10 may be usually a metal rod upon which the cable may be formed, the cable having the extensible and automatically retractable coiled portion such as 11 and an uncoiled portion such as 12, which latter is adapted to form a connecting tail for the cable or cord, which, as is well-known may comprise one or more and in this instance three insulated conductors 13 encased in a sheath of rubber-like vulcanizable material 14.

Since, it is usual and desirable in high speed quantity production of such cables to rotate the mandrel 10, by any suitable means which need not be here described, in order to coil the coiled portion 11 of the cable thereon, it is highly advantageous that some means be provided for holding one end of the cable to the mandrel but away from the coiled portion thereof while the coiled portion is being coiled, such end of the cable which is held to the mandrel being desirably in straight uncoiled form and adapted to be used as a connecting tail for the cable in its final form, and the present invention provides means for this purpose.

Pursuant thereto and in accordance with the present invention a clamping member is provided indicated generally by the numeral 15 and embodying a mandrel engaging part 16 and a cable carrying and positioning part 17, clamping means such as the thumb screw 18 being located adjacent the juncture of the two clamp parts for purposes later described.

The mandrel engaging part 16 desirably includes a plurality of parallel U-shape formations 19 and 20 here joined by a web 16a. The U-shape formation 19 has the legs 21 and 22 and the U-shape formation 20 has legs 23 and 24. The mandrel 10 lies in these formations extending through both formations and between the legs 21 and 22 of the U-shape formation 19 as well as between the legs 23 and 24 of the U-shape formation 20, which thus constitute the mandrel receiving slots 19a and 20a respectively wherein the mandrel is clamped or wedged by the free end 25 of the thumb screw 18 to secure the clamp member and mandrel together.

In this instance, the leg 21 of the U-shape formation 19 is extended in another U-shape formation as at 26 to provide a lateral abutment 27 for a purpose later explained, and extending between the U-shape formations 19 and 20 is a screw receiving element 28 at right angles to the web 16a. As here shown, the screw receiving element 28 is reinforced by a filler block 29 (Fig. 4) which may be welded thereto as at 30. The U-shape formations 19 and 20, lateral abutment 26, and screw receiving elements 28 and 29 together constitute a base member for the clamp member.

Extending also across the U-shape formations 19 and 20 in parallel with the screw receiving elements 28—29 and in rotative abutment therewith as at 31 (also see Fig. 4) is a knuckle element 32, which, in this instance, is somewhat circular and passes the shank 33 of the thumb screw 18 therethrough freely as at 34, the extreme inner end of the shank 33 being threaded as at 35 to screw into the tapped perforations 36 in the screw receiving elements 28—29. The outer end of the thumb screw 18 has a wing head 38. Thus, the elements 28—29 and 32 jointly form a knuckle for the clamp member, having in this instance relatively rotating parts.

The knuckle element 32 is advantageously made with an angular edge for rotative purposes, and, in accordance with the present embodiment, is integral with the cable carrying and positioning part 17 of the device and which as here shown includes in addition to the knuckle element 32 an arm 39 integral with the knuckle element 32 and extending outwardly therefrom. The arm 39 includes a trough-like formation 40 which is grooved or troughed as at 41 to receive the uncoiled cable portion 12 therein and maintain this uncoiled portion straight. Adjacent the bight 42 of the cable where the uncoiled portion thereof joins the coiled portion, the arm 39 has a curvilinear entrance formation 43 through which the cable passes to the trough formation 40 and which is rounded to avoid marking the relatively soft material 14 of the cable prior to vulcanization.

Releasably to retain the cable end 12 in the trough-like formation 40, the latter is provided with a cover 44 which is movable with respect to the arm 39 and in fact, in this instance is removable therefrom but has means for clamping itself to the arm. In this instance, such means may comprise a pair of hooks 45 adapted to engage one edge 46 of the arm 39 and to be drawn tightly thereagainst by a spring lug 47 which has a groove 48 therein to receive the other edge 49 of the arm 39. The extension 50 of the lug 47 acts as a thumb piece as well as a spring lock by which the cover 44 may be sprung onto or off of the arm 39 against the resilience of the lug 47 which thus acts somewhat as a releasable spring clamp.

Further in accordance with the present invention and in the embodiment here disclosed which includes the provision of the pivotal connection between the cable carrying and positioning part 17 and the mandrel engaging part 16, and to permit this ready pivoting in either direction on the arc 51, the shank 33 of the thumb screw 18 may carry an arch plate spring 52, which may have a collar 53 pinned as at 54 onto the screw shank 33. Spatulate fingers 55 of the arch spring 52 press against the outer face 56 of the knuckle part 32 of the cable carrying and positioning part 17 as the thumb screw 18 is screwed inwardly to clamp the device on the mandrel, while leaving the arm 39 of the cable carrying and positioning part 17 swingable, as already mentioned, with the knuckle part 32 and with respect to the relatively stationary mandrel engaging part 16, against the friction between these parts at the point 31 created by the spring 52, the parts being thus yieldably relatively rotatable.

The cover 44 is desirably longitudinally and centrally semi-circularly grooved as at 57 to mate with the grooving 41 in the arm 39 and thus together provide a cylindrical passageway for the cable uncoiled end 12, and the ends of the grooving 57 are desirably curled outwardly as at 58 to avoid marking the soft unvulcanized sheath material 14.

Operation in accordance with the present invention is as follows:

With the mandrel 10 mounted in any suitable support permitting rotation of the mandrel on its axis, the clamp member 15 is secured to the mandrel at any place therealong selectively at which it may be desired to form a coiled cable. In this position with respect to the mandrel, the cable carrying and positioning part 17 of the clamp member may be preliminarily rotated to the position such as shown in dotted lines in Figure 1 and as shown in Figure 2. Thereupon one end of the cable, such as the end 12 is led through the entrance 43 and is laid in the groove 41 of the arm 39 and the cover 44 clamped thereover, it being understood that the cable end then is fairly tightly held.

The cable is then looped over the mandrel as by the initial loop 59, and the other free end of the cable (not shown) may be held yieldingly while the mandrel is rotated in the direction of the arrow 60. Thereupon the cable is coiled on the mandrel as in the coiled portion 11, which, it will be understood, is here shown discontinued, to save space, short of the full extent to which the coiled portion 11 may be formed as desired.

When the coiled portion 11 of the cable has been formed to the extent desired, rotation of the mandrel is stopped and the cable carrying and positioning part 17 of the clamp member 15 is rotated from the position shown in dotted lines in Figure 1 and as shown in Figure 2, to the position shown in full lines in Figure 1, that is, so as to carry the uncoiled cable portion 12 from a preliminary position in which it was located away from the coiled portion 11, during coiling of the latter, to a position in which is now located lapping the coiled portion 11 and extending somewhat longitudinally thereof.

It may be understood that if desired the other opposite free end of the cable may be similarly held and disposed by another clamp member 15, which, however, is not here shown.

Next, the entire assembly, including mandrel, cable, and clamp member may be subjected to a vulcanizing treatment during which the cable sheath 14 is vulcanized or cured to the extent desired to give the cable the required resilience and retractability when used say as an extension cord, and so that its coiled portion 11, which it will be seen is in the form of a helix, may be stretched and then automatically retracted.

During the cure, the cover 44 together with the arm 39, which form at least a partial enclosure for the uncoiled cable end 12, may serve the purpose of absorbing some of the heat which would otherwise reach the vulcanizable material 14 in the cable 12, and thus serve to reduce the degree of cure which this cable end receives, for purposes of facilitating use of this cable end as an electrical connecting tail for the cable. Also, during the winding and the cure, the lateral abutment 27 incorporated in the clamp member, serves to hold the cable helix formed by the coiled portion 11 of the cable, and particularly the first turn 59 thereof, in position while being initially coiled and later while being vulcanized, and thus providing an abutment against which the helix may be formed and maintained until vulcanized.

After the vulcanizing treatment has been completed, the cover 44 is removed and the entire clamp member 15 may be disengaged from the mandrel whereupon the coiled portion 11 of the cable may be slipped off the mandrel.

Finally, as already alluded to, the direction of the helical coils of the cable may be reversed, as shown in the Campbell Patent No. 2,173,096, to enhance its resilience and retractability. When so reversed, the cable will then have the form shown in Figure 6 in which the coils instead of having a righthand turn, so to speak, as in Figure 1, will now have a lefthand turn as shown in Figure 6. At the same time, the uncoiled cable end 12 will now extend longitudinally away from the coiled portion 11 instead of longitudinally lapping it as shown in Figure 1. It may be wondered why the cable end 12 should have an oblique lapping position in Figure 1 while assuming a straight longitudinal position after reversal as shown in Figure 6, but it has been found that if the conductors 13 are wound together or precabled before the sheath 14 is extruded thereonto, and as disclosed in the Geraty Patent No. 2,394,762 issued February 12, 1946, and this cabling embodies a relatively tight twisting of the conductors 13, that the phenomenon here referred to will advantageously occur, namely of curing the cable with the cable end 12 oblique and lapping the coiled portion while causing it to be longitudinal and parallel to the axis of the helix after reversal.

In place of the cover 44, the cable end 12 could be held on the arm 39 by passing it through an aperture 40a therein as shown in dotted lines in Figure 2.

It will be understood that when it is desired to initially wind the cable by a left-hand coil turn (instead of right-hand as in Fig. 1) a clamp member like that here shown but adapted for a left-hand coil turn on the mandrel may be provided reciprocal in construction.

Manifestly the invention is not limited to details of construction shown for purposes of exemplification and it may not be essential that all elements of the combination be used at all times together, since it is to be understood that it is intended that various combinations or sub-combinations may be employed and such changes may be made as fall within the appended claims without departing from the invention.

The invention having been described, what is here claimed is:

1. Means for the production of elastic coil cables embodying a vulcanizable material and for use with a mandrel for coiling the cable thereon during vulcanization of the material, embodying, a clamp member, comprising, a mandrel engaging part arranged to be clamped to the mandrel, said mandrel engaging part including a U-shape base adapted to receive the mandrel therein, a cable carrying part arranged to clamp an uncoiled cable portion thereto, said cable carrying part including a knuckle element and an arm element, said knuckle element being secured to the base and said arm element being trough-shape to receive the cable therein and having a curvilinear entrance formation for the cable adjacent the knuckle element, and a clamping screw passing through said knuckle element and a leg of the base to which the knuckle element is attached, for engagement with the mandrel.

2. Means for the production of elastic coil cables embodying a vulcanizable material, comprising, a mandrel for coiling the cable thereon, and a clamp member having a mandrel engaging part arranged to be clamped to the mandrel and a cable carrying part arranged to clamp an uncoiled cable portion thereto, said cable carrying part including an arm element pivotally secured to the mandrel engaging part for swinging movements of said arm element with respect to the mandrel in the plane of the axis of the mandrel.

3. Means for production of elastic coil cables embodying a vulcanizable material and for use with a mandrel for coiling the cable thereon during vulcanization of the material, embodying, a clamp member, comprising, a mandrel engaging part arranged to be clamped to the mandrel, a cable carrying part arranged to clamp an uncoiled cable portion thereto, said cable carrying part including a knuckle element and an arm element, said knuckle element being secured to the mandrel engaging part, and a clamping element for engagement with the mandrel, wherein there is an aperture in said arm adjacent its end opposite said knuckle element to receive the cable end therethrough to retain the cable end in position.

4. Means for production of elastic coil cables embodying a vulcanizable material and for use with a mandrel for coiling the cable thereon during vulcanization of the material, embodying, a clamp member, comprising, a mandrel engaging part including a U-shape base adapted to receive the mandrel therein, a cable carrying part arranged to clamp an uncoiled cable portion thereto, said cable carrying part including a knuckle element and an arm element, said knuckle element being secured to the base, and a clamping screw passing through said knuckle element and a leg of the base to which the knuckle element is attached for engagement with the mandrel, wherein the knuckle element is pivoted to said leg on the shank of said screw and there is a spring interposed between the head of the screw and the knuckle element to create friction therebetween to yieldingly permit swinging of the cable carrying part with respect to the mandrel engaging part.

5. Means for production of elastic coil cables embodying a vulcanizable material and for use with a mandrel for coiling the cable thereon during vulcanization of the material, embodying, a clamp member, comprising, a mandrel engaging part arranged to be clamped to the mandrel, said mandrel engaging part including a U-shape base adapted to receive the mandrel therein, a cable carrying part arranged to clamp an uncoiled cable portion thereto, said cable carrying part including a knuckle element and an arm element extending away from the mandrel, said knuckle element being secured to the base and said arm element being adapted to hold the uncoiled cable portion in uncoiled form during vulcanization, and a clamping element for engagement with the mandrel, wherein the said base is formed of sheet material bent in a plurality of U formations.

6. Means for production of elastic coil cables embodying a vulcanizable material and for use with a mandrel for coiling the cable thereon during vulcanization of the material, embodying, a clamp member, comprising, a mandrel engaging part arranged to be clamped to the mandrel, a cable carrying part arranged to clamp an uncoiled cable portion thereto, said cable carrying part including a knuckle element and an arm element, said knuckle element being secured to the mandrel engaging part and said arm element being trough-shape to receive the cable therein, and a clamping screw passing through said knuckle element for engagement with the mandrel, wherein there is a movable cover for the cable carrying part and means for clamping the cover thereto.

RALPH J. ARNOLD.
WILLIAM D. MacDONALD.
RALPH D. COLLINS.

REFERENCES CITED

The following references are of record in the file of this patent:

UNITED STATES PATENTS

| Number | Name | Date |
|---|---|---|
| 458,115 | Thomson | Aug. 18, 1891 |
| 865,116 | Moore | Sept. 3, 1907 |
| 2,039,475 | Campbell | May 5, 1936 |
| 2,271,057 | Barrans | Jan. 27, 1942 |
| 2,339,683 | Cox | Jan. 18, 1944 |
| 2,343,881 | Brundage | Mar. 14, 1944 |
| 2,363,826 | Yellin | Nov. 28, 1944 |

FOREIGN PATENTS

| Number | Country | Date |
|---|---|---|
| 90,863 | Germany | Oct. 5, 1895 |